(12) United States Patent
Nishimura

(10) Patent No.: US 6,657,791 B2
(45) Date of Patent: Dec. 2, 2003

(54) ZOOM LENS AND OPTICAL APPARATUS HAVING THE SAME

(75) Inventor: Takeshi Nishimura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 128 days.

(21) Appl. No.: 09/852,307

(22) Filed: May 10, 2001

(65) Prior Publication Data

US 2002/0018302 A1 Feb. 14, 2002

(30) Foreign Application Priority Data

May 12, 2000 (JP) ....................................... 2000-140117

(51) Int. Cl.⁷ ................................................ G02B 15/14
(52) U.S. Cl. ....................................... 359/686; 359/683
(58) Field of Search ................................. 359/683, 676, 359/686

(56) References Cited

U.S. PATENT DOCUMENTS

| | | | |
|---|---|---|---|
| 5,757,556 A | 5/1998 | Nishimura | 359/692 |
| 5,798,873 A | 8/1998 | Hoshi et al. | 359/692 |
| 5,872,658 A | 2/1999 | Ori | 359/677 |
| 5,982,544 A | 11/1999 | Ogata | 359/565 |
| 6,052,541 A | 4/2000 | Nishimura | 396/382 |
| 6,067,196 A | 5/2000 | Yamamoto et al. | 359/565 |
| 6,094,314 A | 7/2000 | Tanaka | 359/689 |
| 6,236,515 B1 * | 5/2001 | Yamamoto et al. | 359/689 |

FOREIGN PATENT DOCUMENTS

| | | |
|---|---|---|
| JP | 9-197273 | 7/1997 |
| JP | 9-197274 | 7/1997 |
| JP | 9-211329 | 8/1997 |
| JP | 10-142504 | 5/1998 |
| JP | 10-142505 | 5/1998 |
| JP | 10-148757 | 6/1998 |
| JP | 10-160916 | 6/1998 |
| JP | 10-161022 | 6/1998 |
| JP | 10-213744 | 8/1998 |
| JP | 10-333036 | 12/1998 |
| JP | 11-14043 | 1/1999 |
| JP | 11-23968 | 1/1999 |
| JP | 11-109242 | 4/1999 |
| JP | 11-149043 | 6/1999 |

* cited by examiner

Primary Examiner—Scott J. Sugarman
(74) Attorney, Agent, or Firm—Fitzpatrick, Cella, Harper & Scinto

(57) ABSTRACT

A zoom lens includes, in succession from the object side, a first lens unit of negative optical power, a second lens unit of positive optical power, a third lens unit of positive optical power and a fourth lens unit of negative optical power. In case of zooming from the wide angle end to the telephoto end, the spacing between the first lens unit and the second lens unit is increased, the spacing between the second lens unit and the third lens unit is increased, and the spacing between the third lens unit and the fourth lens unit is decreased. At least one of the first to fourth lens units has a diffraction optical portion.

12 Claims, 11 Drawing Sheets

ZOOM LENS AND OPTICAL APPARATUS HAVING THE SAME

BACKGROUND OF THE INVENTION

1. Field of the Invention

This invention relates to a zoom lens and an optical apparatus using the same, and particularly is suitable for an optical apparatus such as a photographic camera, a video camera, a digital camera or a camera for broadcasting using a diffraction optical element in a portion of the lens system thereof to thereby well correct aberrations, particularly chromatic aberration.

2. Related Background Art

In optical apparatus such as electronic still cameras, video cameras and photographic cameras, with the downsizing and lighter weight thereof, the downsizing and lighter weight of image pickup zoom lenses used therein have heretofore been strongly demanded.

As a zoom lens, it has been demanded to have a high variable power ratio, and to have high optical performance in which aberration correction has been effected well with the higher definition of an image pickup element.

As a method of effecting aberration correction well, it is known that it is effective to effect it by the use of an aspherical surface. The use of an aspherical surface is effective to correct aberrations such as spherical aberration, curvature of image field and coma. The correction of chromatic aberration, however, is difficult. Particularly in a compact zoom lens with a zooming ratio of about three having a small number of lenses, the combination of glass materials is limited because the number of lenses is small, and it is difficult to correct chromatic aberration well. Of the chromatic aberration, it is particularly difficult to eliminate secondary spectrum. In the latest zoom lenses, it is a great task to shorten the full length of the lens, and yet correct aberrations including chromatic aberration well and maintain optical performance good.

On the other hand, as a method of keeping chromatic aberration small, it has been proposed in recent years to apply a diffraction optical element to an image pickup optical system. There has also been proposed what uses a diffraction optical element in a zoom lens to aim at higher variable power ratio.

As a zoom lens of the simplest lens construction, there is a negative-positive two-unit zoom lens which comprises, in succession from the object side, a first lens unit having negative refractive power, and a second lens unit having positive refractive power, and in which both lens units are moved to thereby effect a focal length change. This negative-positive two-unit zoom lens forms a retrofocus type and has a relatively long back focal length and is therefore best suited for the optical system of a camera like a single-lens reflex camera which requires a long back focal length. What uses a diffraction optical element in such negative-positive two-unit zoom lens is proposed, for example, in Japanese Patent Application Laid-Open No. 10-161022 (corresponding U.S. Pat. No. 6,094,314), Japanese Patent Application Laid-Open No. 10-213744, etc.

As a zoom lens of the simplest lens construction having a relatively short back focal length, there is a positive-negative two-unit zoom lens which comprises, in succession from the object side, a first lens unit of positive refractive power and a second lens unit of negative refractive power and in which both lens units are moved to thereby effect a focal length change (zooming). In such positive-negative two-unit zoom lens, what uses a diffraction optical element to achieve higher performance is proposed, for example, in Japanese Patent Application Laid-Open No. 9-197273, Japanese Patent Application Laid-Open No. 9-197274, Japanese Patent Application Laid-Open No. 10-142504. Japanese Patent Application Laid-Open No. 10-142505 (U.S. Pat. No. 6,067,196 corresponding to these four cases), etc. The assignee of the application also has proposed a zoom lens of similar construction in Japanese Patent Application Laid-Open No. 11-149043.

These positive-negative two-unit zoom lenses form the so-called telephoto type. Therefore, the optical full length becomes short and the back focal length at the wide angle end is also short. Such zoom lens has only two lens units and is therefore simple in mechanical construction, and is often used in a lens shutter camera or the like which does not require a particularly long back focal length.

Generally, as an optical system (taking lens) suitable for a lens shutter camera or the like which does not require a long back focal length and in which the exit angle in the optical system does not affect very much, it is preferable for the last lens unit (the lens unit most adjacent to the image plane side) to have negative refractive power because it can form the telephoto type and shorten the optical full length. This also holds true of zoom lenses having three or more lens units.

Three-unit zoom lenses comprising three lens units and having a relatively short back focal length which use a diffraction optical element to achieve higher performance are proposed, for example, in Japanese Patent Application Laid-Open No. 11-23968 (corresponding U.S. Pat. No. 5,982,544), etc. The assignee of the application also has proposed a zoom lens of similar construction in Japanese Patent Application Laid-Open No. 11-109242.

Any of these is a positive-positive-negative three-unit zoom lens comprising, in succession from the object side, a first lens unit having positive refractive power ratio (zooming ratio), a second lens unit having positive refractive power, and a third lens unit having negative refractive power, and realizes a zoom lens of high variable power ratio (zooming ratio) in which chromatic aberration is sufficiently corrected by the diffraction optical element.

Also, four-unit zoom lenses comprising four lens units as a whole which use a diffraction optical element to achieve higher performance are proposed, for example, in Japanese Patent Application Laid-Open No. 9-211329 (corresponding U.S. Pat. No. 5,872,658), Japanese Patent Application Laid-Open No. 10-148757, Japanese Patent Application Laid-Open No. 10-160916, Japanese Patent Application Laid-Open No. 10-333036, etc. Any of these comprises a construction having, in succession from the object side, a first lens unit of positive refractive power, a second lens unit of negative refractive power, a third lens unit of positive refractive power and a fourth lens unit of positive refractive power.

The negative-positive two-unit zoom lens becomes long in the optical full length and is therefore disadvantageous for a compact optical apparatus because the entire apparatus becomes bulky.

Also, the positive-negative two unit zoom lens, even if chromatic aberration therein is corrected well, becomes small in the degree of freedom of aberration correction because the number of the lens units is only two, and if an attempt is made to achieve higher variable power ratio, the other aberrations than chromatic aberration will occur greatly and it will become difficult to correct this well. Particularly at the position of the focal length (zoom) intermediate of the wide angle end and the telephoto end, the image plane becomes under and therefore, if an attempt is made to maintain both of downsizing and high optical performance, the upper limit of the variable power ratio will become the order of 3.

Also, the positive-positive-negative three-unit zoom lens makes up for the drawback of the aberration correction of the two-unit zoom lens and can cope with higher variable power ratio to a certain degree. However, it is difficult to achieve higher variable power ratio and yet obtain high optical performance.

In contrast, the positive-negative-positive-positive four-unit zoom lens is suited for higher variable power and can have its back focal length made relatively long, but the optical full length thereof becomes long and this is disadvantageous for the downsizing of the entire lens system.

So, it is conceivable to reduce the number of lenses in each lens unit to thereby shorten the full length of the lens.

However, a cemented lens is used in each lens unit to correct chromatic aberration occurring in each lens unit and therefore, if the number of lenses is decreased, the element for correcting chromatic aberration will become insufficient and it will become difficult to correct chromatic aberration well within the entire variable power range.

SUMMARY OF THE INVENTION

It is the object of the present invention to provide a zoom lens in which a desired variable power ratio is secured and yet chromatic aberration can be corrected well within the entire variable power range, and an optical apparatus using the same.

In order to achieve the above object, the zoom lens of the present invention is a zoom lens which comprises, in succession from the object side, a first lens unit of negative optical power, a second lens unit of positive optical power, a third lens unit of positive optical power and a fourth lens unit of negative optical power, wherein in case of the zooming from the wide angle end to the telephoto end, the spacing between the first lens unit and the second lens unit is increased, the spacing between the second lens unit and the third lens unit is increased, and the spacing between the third lens unit and the fourth lens unit is decreased, and is characterized in that at least one of the first to fourth lens units has a diffraction optical portion.

DESCRIPTION OF THE PREFERRED EMBODIMENTS

Figure 1:
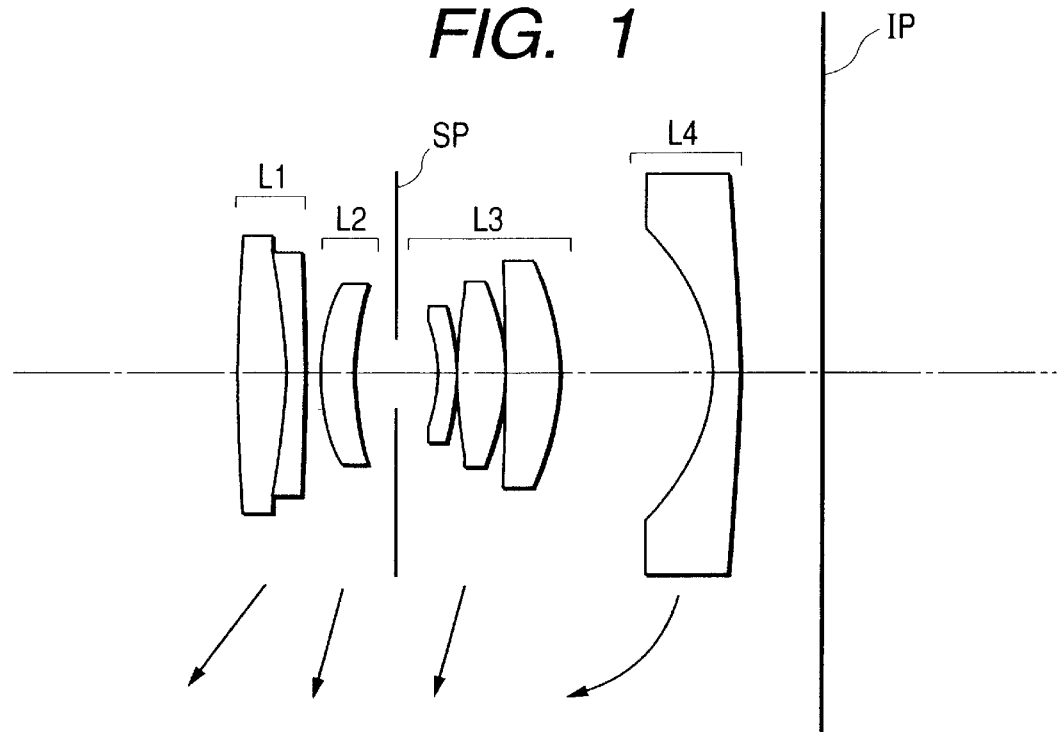
FIG. 1 is a cross-sectional view of a zoom lens according to Numerical Embodiment 1.
Figure 2:
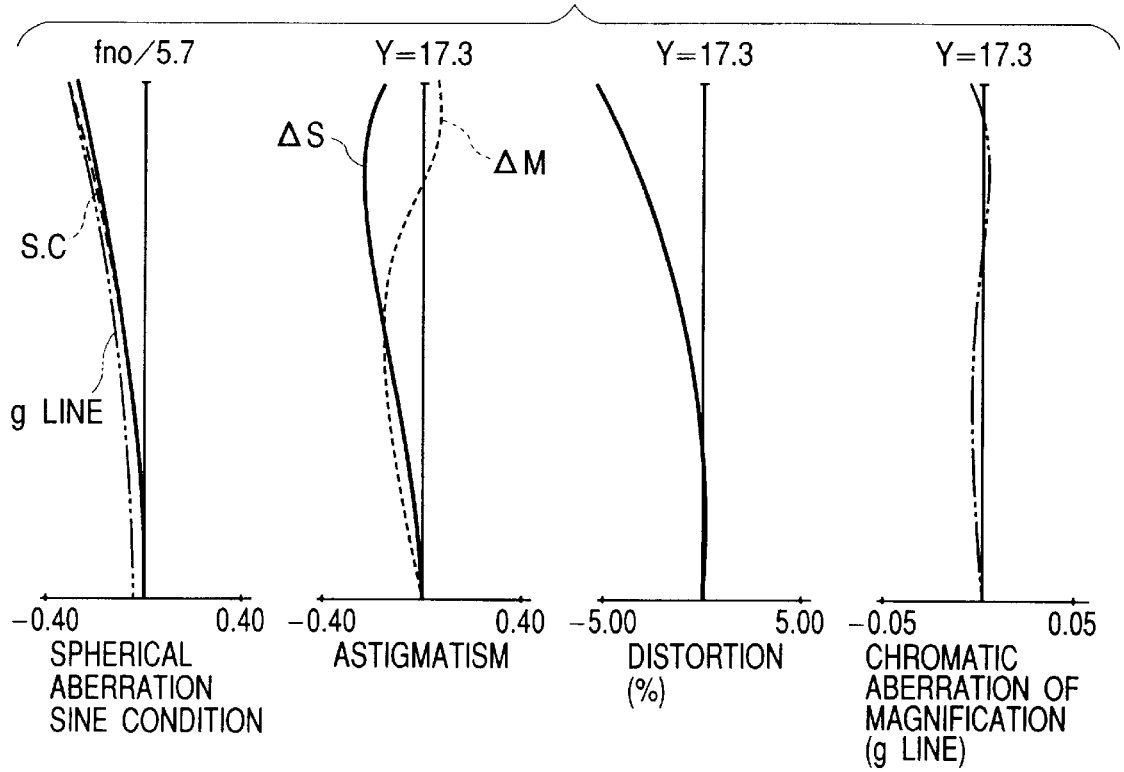
FIG. 2 shows the aberrations at the wide angle end of the zoom lens according to Numerical Embodiment 1.
Figure 3:
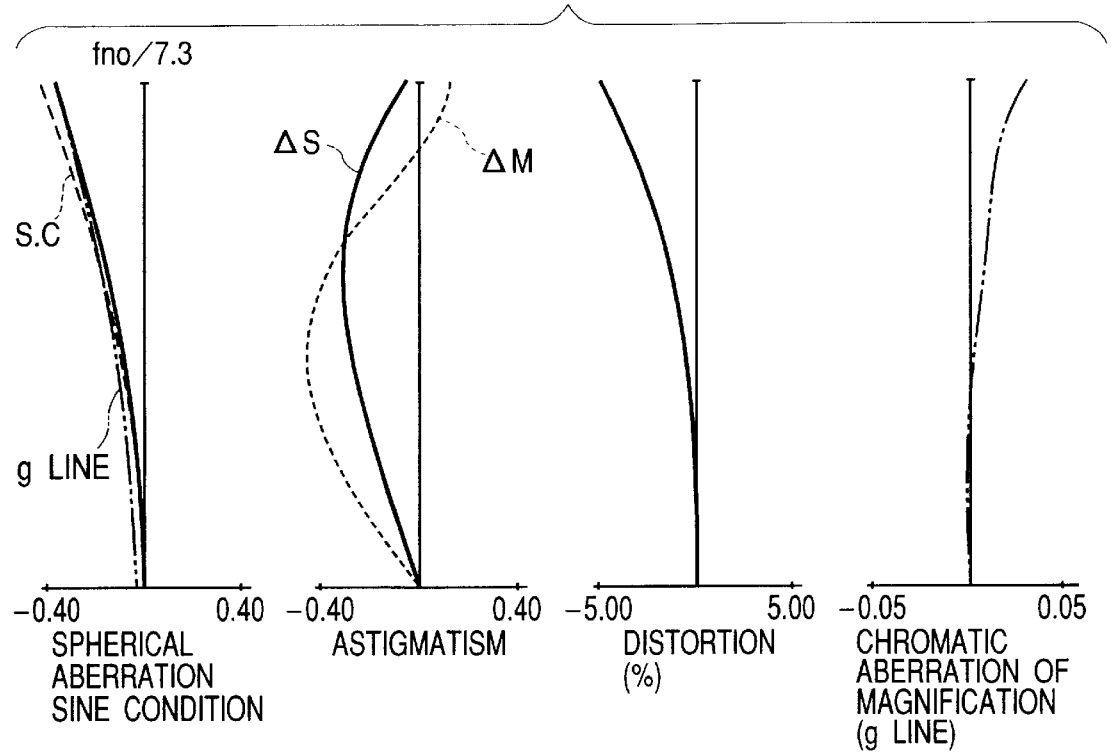
FIG. 3 shows the intermediate aberrations of the zoom lens according to Numerical Embodiment 1.
Figure 4:
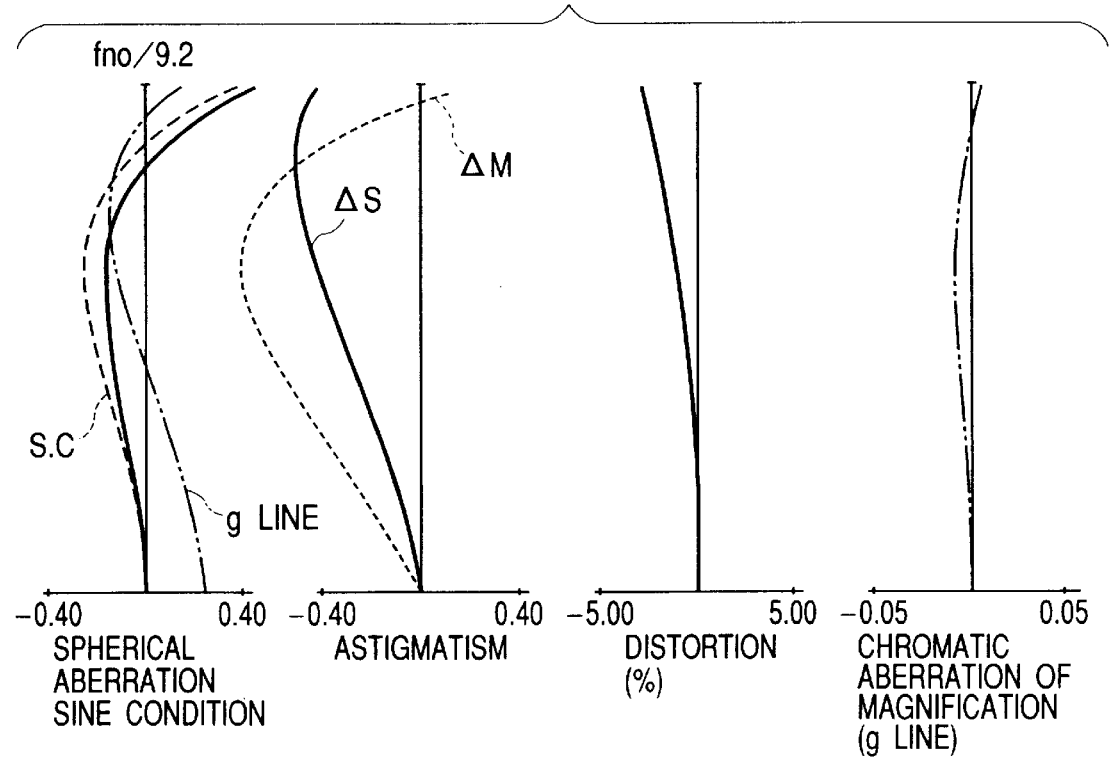
FIG. 4 shows the aberrations at the telephoto end of the zoom lens according to Numerical Embodiment 1.
Figure 5:
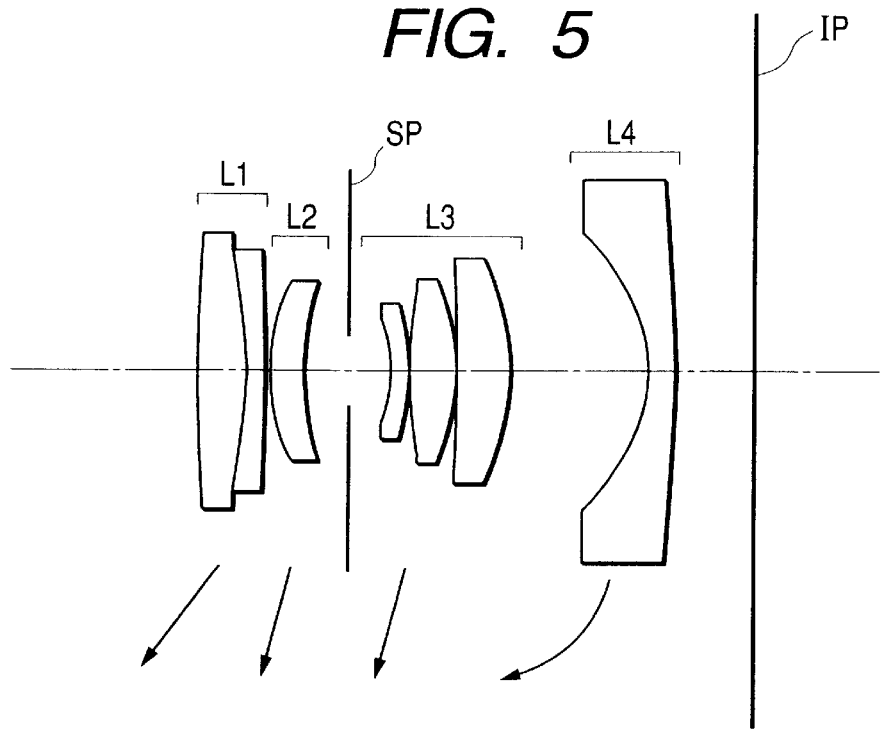
FIG. 5 is a cross-sectional view of a zoom lens according to Numerical Embodiment 2.
Figure 6:
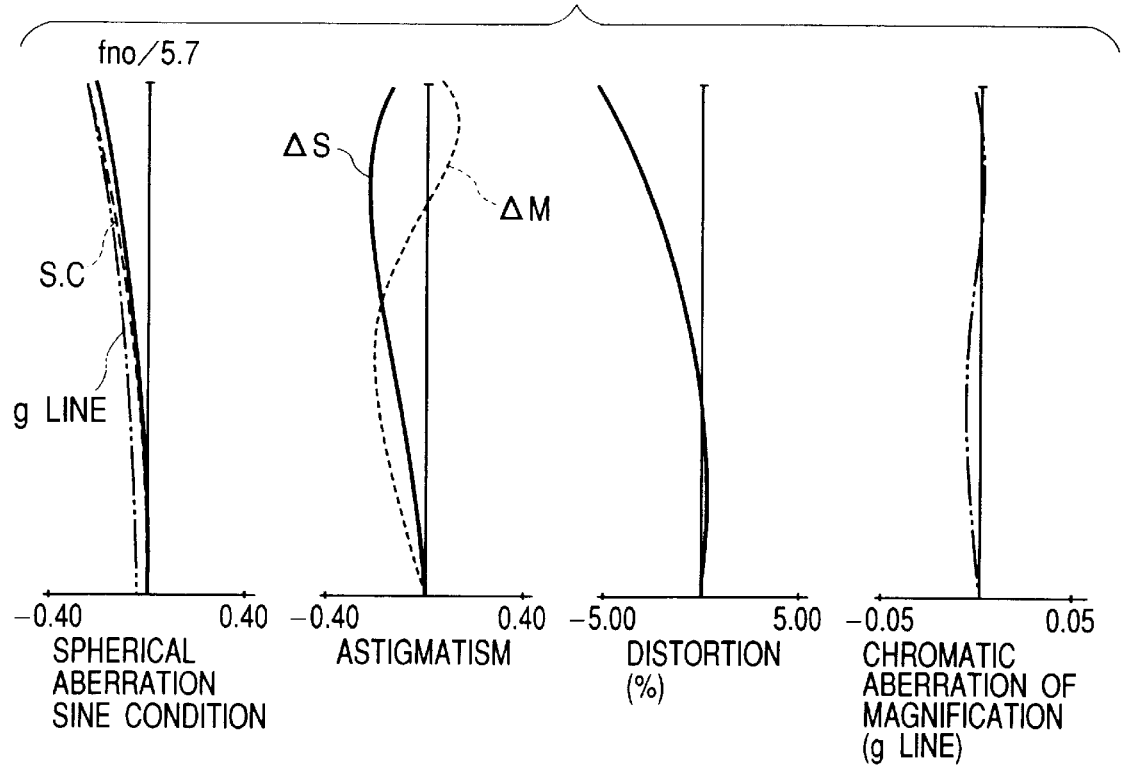
FIG. 6 shows the aberrations at the wide angle end of the zoom lens according to Numerical Embodiment 2.
Figure 7:
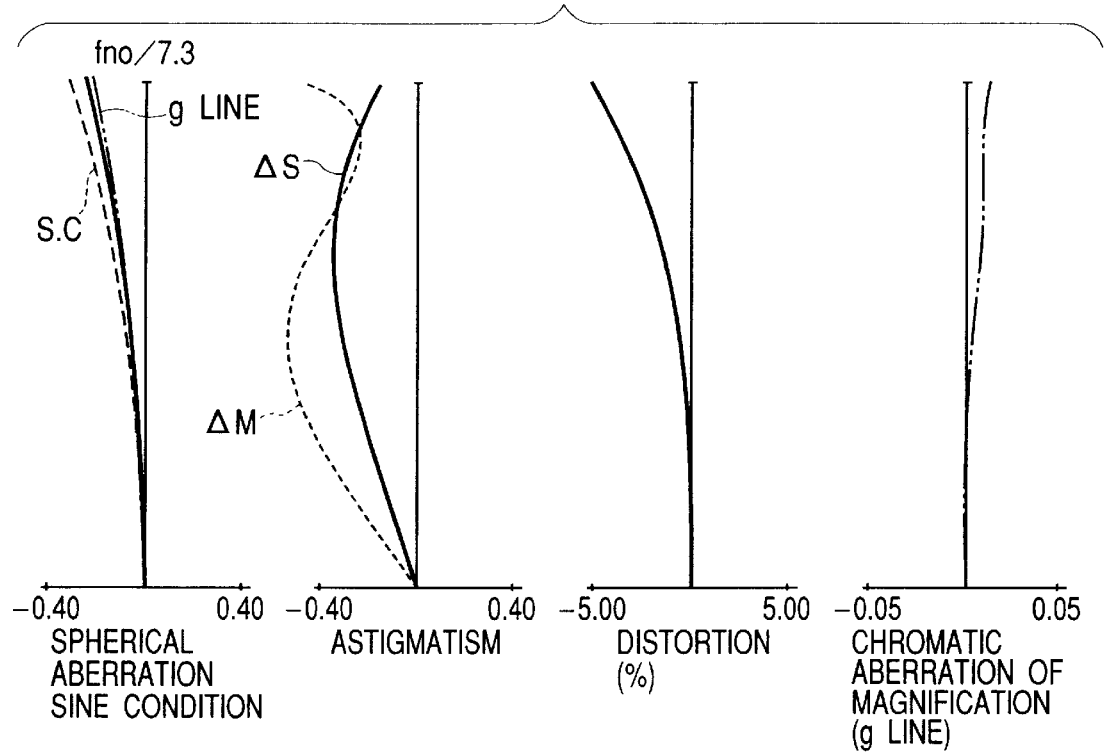
FIG. 7 shows the intermediate aberrations of the zoom lens according to Numerical Embodiment 2.
Figure 8:
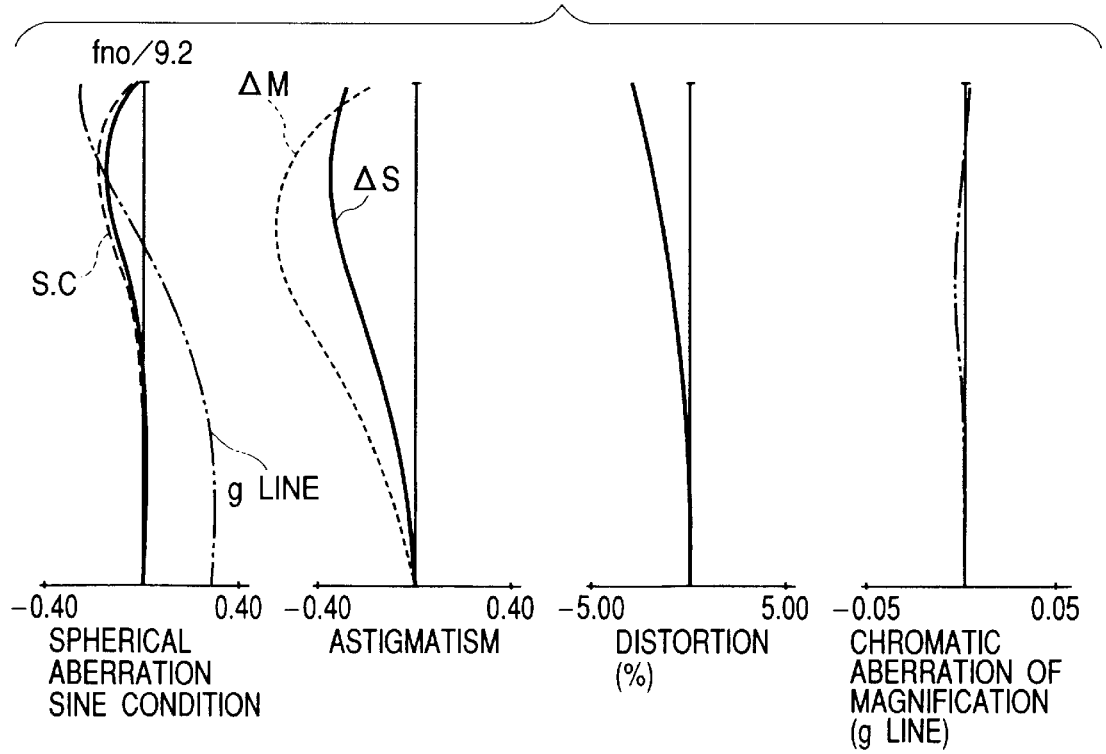
FIG. 8 shows the aberrations at the telephoto end of the zoom lens according to Numerical Embodiment 2.
Figure 9:
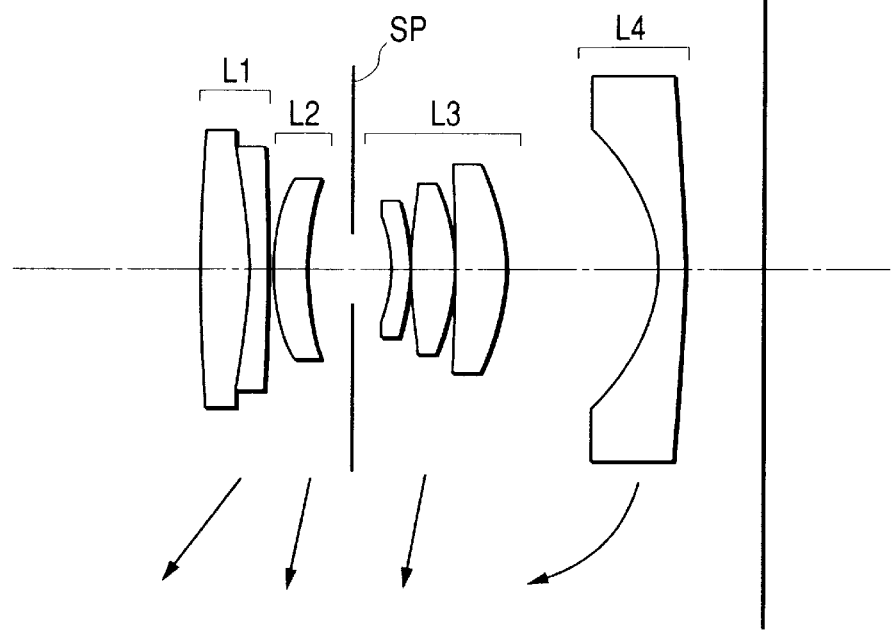
FIG. 9 is a cross-sectional view of a zoom lens according to Numerical Embodiment 3.
Figure 10:
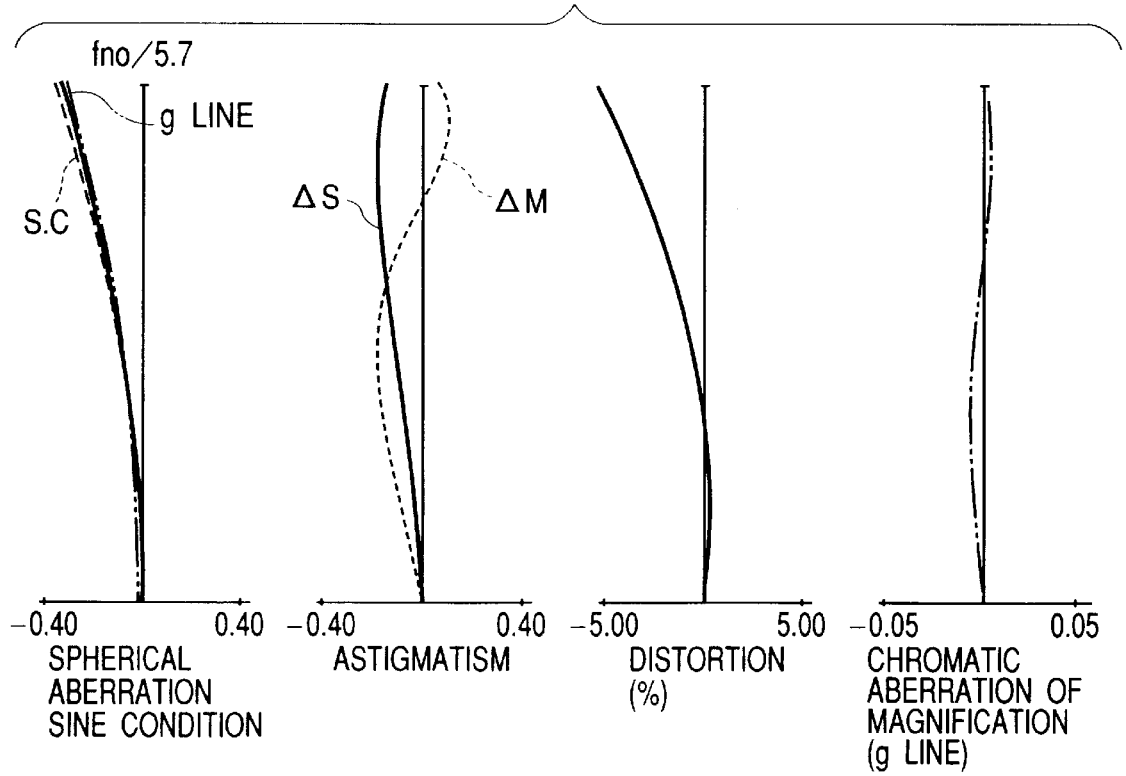
FIG. 10 shows the aberrations at the wide angle end of the zoom lens according to Numerical Embodiment 3.
Figure 11:
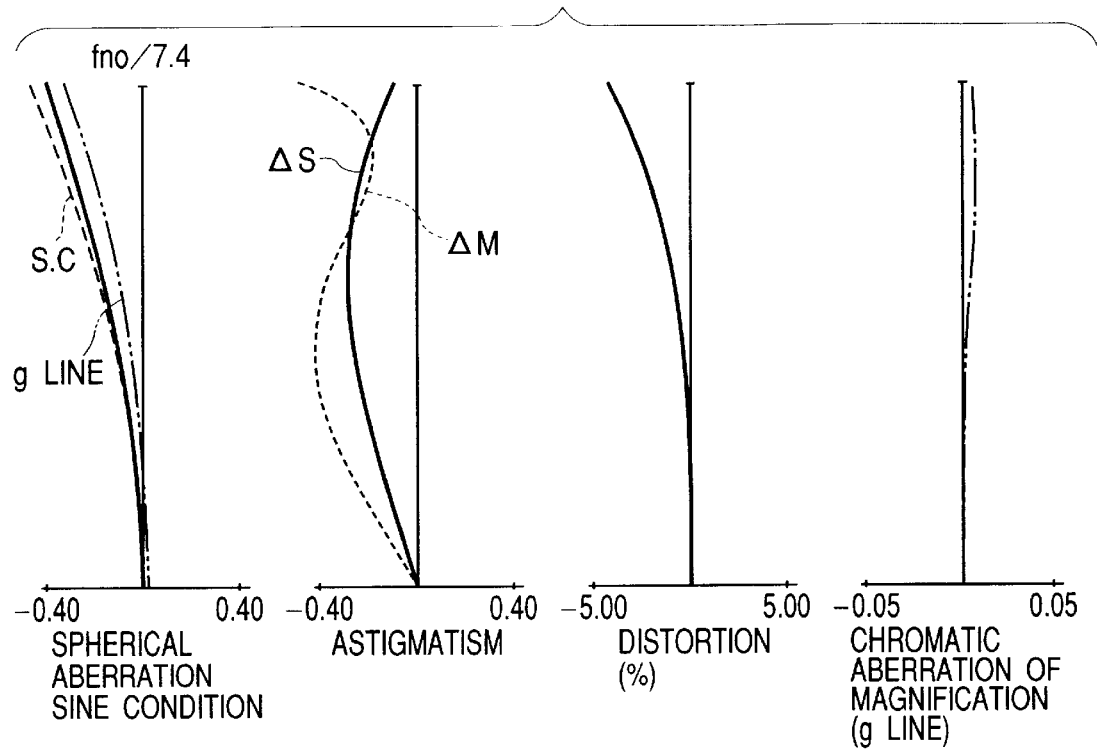
FIG. 11 shows the intermediate aberrations of the zoom lens according to Numerical Embodiment 3.
Figure 12:
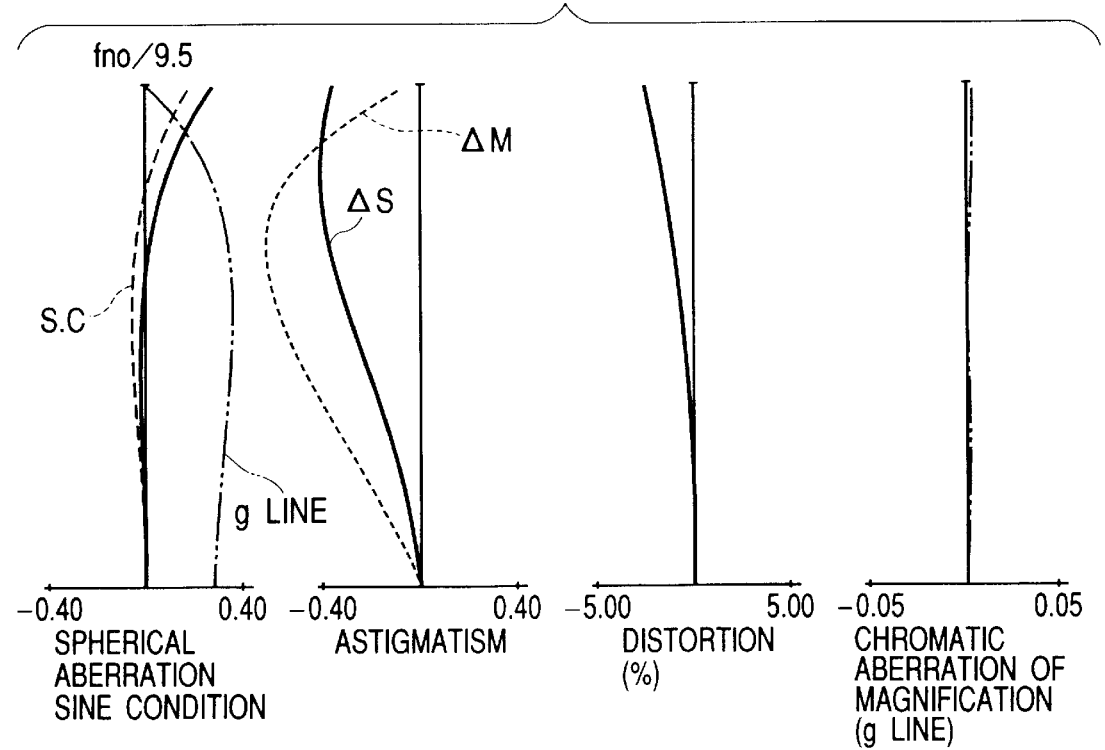
FIG. 12 shows the aberrations at the telephoto end of the zoom lens according to Numerical Embodiment 3.
Figure 13:
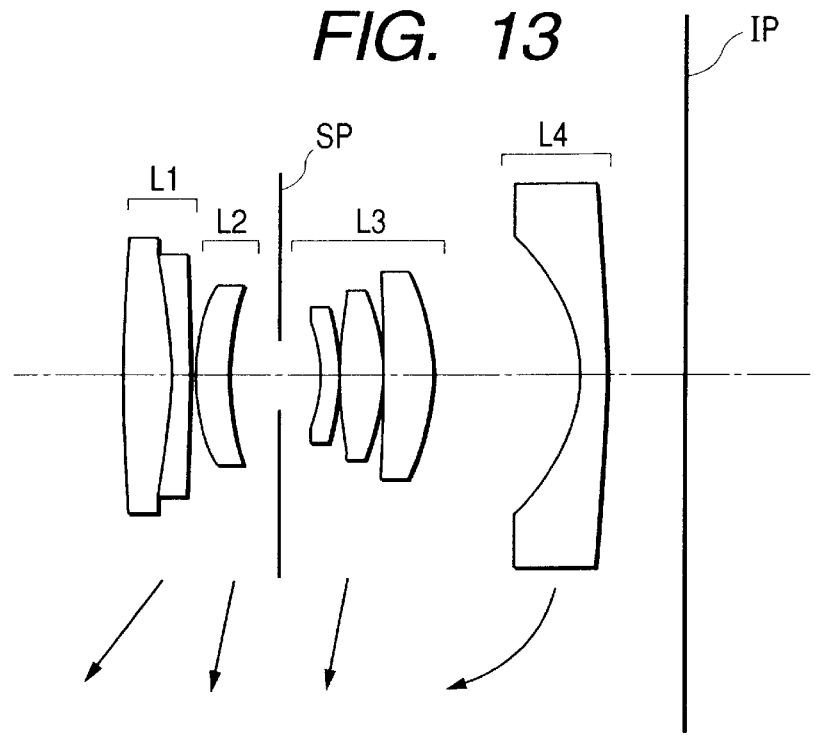
FIG. 13 is a cross-sectional view of a zoom lens according to Numerical Embodiment 4.
Figure 14:
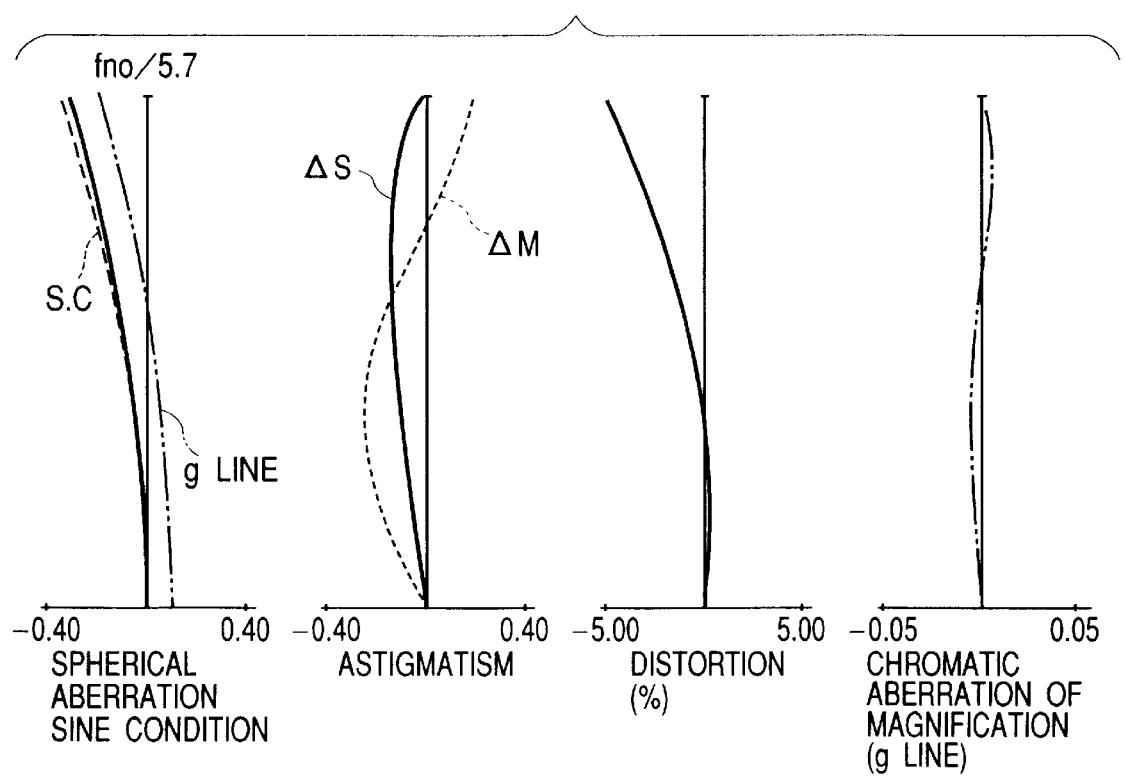
FIG. 14 shows the aberrations at the wide angle end of the zoom lens according to Numerical Embodiment 4.
Figure 15:
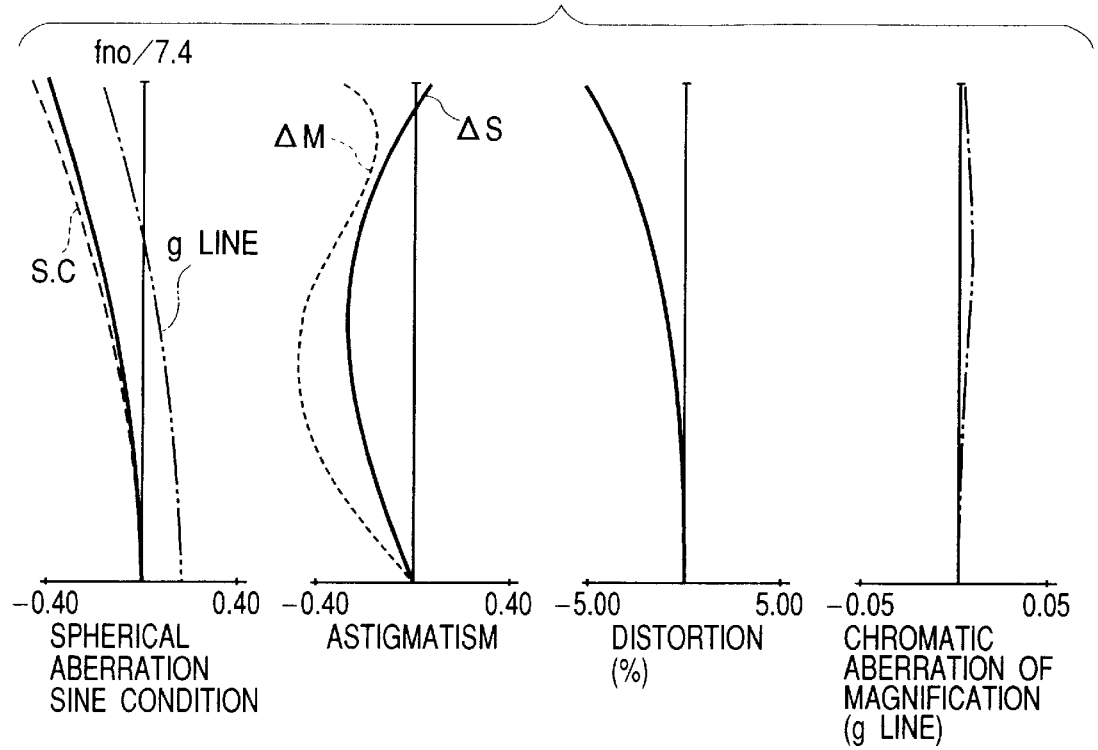
FIG. 15 shows the intermediate aberrations of the zoom lens according to Numerical Embodiment 4.
Figure 16:
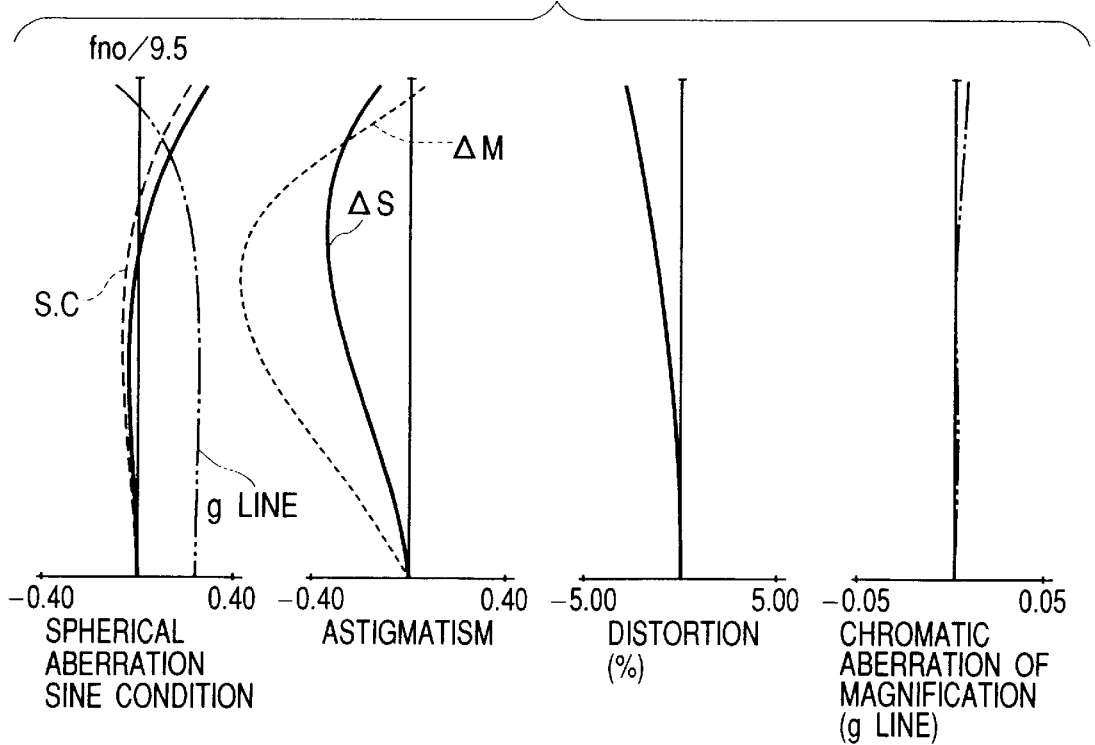
FIG. 16 shows the aberrations at the telephoto end of the zoom lens according to Numerical Embodiment 4.

FIG. 1 is a cross-sectional view of a zoom lens according to Numerical Embodiment 1 which will be described later at the wide angle end thereof, and FIGS. 2, 3 and 4 show the aberrations at the wide angle end, the intermediate focus position and the telephoto end, respectively, of the zoom lens according to Numerical Embodiment 1. FIG. 5 is a cross-sectional view of a zoom lens according to Numerical Embodiment 2 at the wide angle end thereof, and FIGS. 6, 7 and 8 show the aberrations at the wide angle end, the intermediate focus position and the telephoto end, respectively, of the zoom lens according to Numerical Embodiment 2. FIG. 9 is a cross-sectional view of a zoom lens according to Numerical Embodiment 3 at the wide angle end thereof, and FIGS. 10, 11 and 12 show the aberrations at the wide angle end, the intermediate focus position and the telephoto end, respectively, of the zoom lens according to Numerical Embodiment 3. FIG. 13 is a cross-sectional view of a zoom lens according to Numerical Embodiment 4 at the wide angle end thereof, and FIGS. 14, 15 and 16 show the aberrations at the wide angle end, the intermediate focus position and the telephoto end, respectively, of the zoom lens according to Numerical Embodiment 4.

In the cross-sectional views of the respective numerical embodiments shown in FIGS. 1, 5, 9 and 13, L1 designates a first lens unit of negative refractive power (optical power= inverse number of the focal length), L2 denotes a second lens unit of positive refractive power, L3 designates a third lens unit of positive refractive power, and L4 denotes a fourth lens unit of negative refractive power. The arrows indicate the movement loci of the respective lens units when the focal length change from (zooming) the wide angle end to the telephoto end is effected. SP designates a stop for determining the brightness of a ray, and IP denotes the image plane.

In the present embodiment, in case of the zooming from the wide angle end to the telephoto end, the first, second, third and fourth lens units are moved toward the object side on the optical axis thereof as indicated by arrows so that the spacing (the on-axis air space) between the first lens unit and the second lens unit may be increased, the spacing between the second lens unit and the third lens unit may be increased, and the spacing between the third lens unit and the fourth lens unit may be decreased.

Specifically, the first, second and third lens units are moved toward the object side with linear loci and the fourth lens unit is moved toward the object side with a non-linear locus. Thereby a desired variable power ratio is obtained and yet the downsizing of the entire lens system is achieved. Also, focusing is effected by the third lens unit being moved.

In the present embodiment, with the above-described construction as a basic construction, a diffraction optical portion is provided in at least one of the four lens units and the phase thereof is appropriately set, whereby chromatic aberration is corrected well over the entire variable power range.

Generally the Abbe number (dispersion value) of a refracting optical system, when the refractive indices at the respective wavelength of d, C and F lines are defined as Nd, NC and NF, respectively, is represented by $$\nu d = (Nd-1)/(NF-NC).$$

On the other hand, the dispersion value νd in the diffraction optical portion, when the wavelength of d line, C line and F line are defined as λd, λC and λF, respectively, is represented by $$\nu d = \lambda d/(\lambda F - \lambda C)$$

and λd=−3.453.

As described above, the Abbe number ν of ordinary glass is about 20–95, whereas the Abbe number of the diffraction optical portion has a value of ν=−3.453. That is, ordinary glass has a positive Abbe number, whereas the diffraction optical portion has a negative Abbe number. Also, regarding the partial variance ratio, the diffraction optical portion has a value widely different from that of ordinary glass.

In the present embodiment, such a characteristic of the diffraction optical portion is utilized to thereby effect the correction of chromatic aberration efficiently.

It should be noted that the diffraction optical portion can be expressed by the following phase equation:

$$\phi(h) = \frac{2\pi}{\lambda}(C_1 h + C_2 h^2 + C_3 h^3 + C_4 h^4 + C_5 h^5 + \ldots) \quad (1)$$

In the foregoing equation, $\phi(h)$ represents phase, h represents the diametral distance from the optical axis, and λ represents the reference wavelength (design wavelength). That is, the diffraction optical portion is expressed by phase being added to the reference surface. Also, at this time, the optical power $\psi$ of the paraxial first order diffracted light of the diffraction optical portion at the reference wavelength can be expressed as $\psi = -2 \cdot C_2$.

In the present embodiment, the construction as described above is adopted to thereby express a zoom lens of high optical performance in which the variable power ratio is of the order of 3–4 and chromatic aberration is corrected well in spite of compactness.

Also, in the zoom lens according to the present embodiment, the zooming is effected with the respective lens units being moved, and at this time, particularly the third lens unit and the fourth lens unit are given the zooming action. Above all, the fourth lens unit is made to bear its greatest share of the zooming. Also, the entire lens system is made into the telephoto type to thereby achieve the downsizing of the entire lens system.

Also, the first lens unit is made to have negative refractive power, whereby a wider angle becomes easy to achieve, and the first lens unit is greatly moved toward the object side from the wide angle end to the telephoto end, whereby any harmful beam particularly at the telephoto end can be cut and a flare component is reduced.

As previously described, the fourth lens unit is given the greatest zooming action and therefore, the aberration fluctuation during zooming is great. Accordingly, a diffraction optical portion is provided in the fourth lens unit to thereby correct chromatic aberration and obtain high optical performance in the entire variable power region. Also, thereby it is made possible to strengthen the refractive power of each lens unit, and this also contributes to downsizing.

Also, it is preferable that when the back focal length at the wide angle end is defined as bfw and the focal length of the entire system at the wide angle end is defined as fw, the following conditional expression (1) be satisfied:

$$0.10 < bfw/fw < 0.40 \quad (1)$$

Conditional expression (1) prescribes the ratio between the back focal length and the focal length at the wide angle end, and is for achieving the balance between downsizing and higher performance.

In the case of the ratio below the lower limit value of conditional expression (1) the back focal length will become too short and distortion occurring in the fourth lens unit will increase and become difficult to correct, and this is not good. Also, in the case of the ratio exceeding the upper limit value of conditional expression (1) the optical full length will increase, and this is not good.

Further, to achieve the balance between downsizing and higher performance, it is preferable that the lower limit value of conditional expression (1) be 0.15 and the upper limit value thereof be 0.30.

Also, the zoom lens according to the present embodiment satisfies requirements indicated below. The effects resulting from satisfying the respective requirements are as shown below.

(A-1) It is desirable that the fourth lens unit comprise a single lens.

The fourth lens unit bears the greatest zooming function. Also, for the downsizing of the entire lens system, it is necessary to strengthen the refractive power of the fourth lens unit. However, if the refractive power of the fourth lens unit is strengthened, it will become difficult particularly at the telephoto end to secure the on-axis air space between the third lens unit and the fourth lens unit, and the fourth lens unit cannot be given its sufficient share of zooming action. As the result, the lens system will become bulky. Or a sufficient variable power ratio will become unobtainable. Therefore, it is good to construct the fourth lens unit of a single lens. According to this, the principal point of the fourth lens unit can be positioned as adjacent as possible to the object side, and this becomes advantageous for the compatibility of downsizing and the securement of the variable power ratio.

(A-2) It is desirable that the fourth lens unit have a diffraction optical portion and the phase coefficient $C_2$ in the term of the second order at that time satisfy the condition that $$0 < C2 < 0.1. \quad (2)$$

A diffraction optical portion is used in the fourth lens unit bearing its share of the greatest variable power ratio as previously described, whereby it becomes easy to restrain the fluctuation of chromatic aberration upon zooming, and obtain high optical performance in the entire variable power region.

Further, by conditional expression (2) being satisfied, good correction of chromatic aberration is accomplished and high optical performance is obtained.

The fourth lens unit is a lens unit having negative refractive power which bears its share of the variable power ratio and therefore, it is necessary to set such a diffraction optical surface as will correct chromatic aberration occurring by the negative refractive power.

In the case below the lower limit value of conditional expression (2) the correction of chromatic aberration will be opposite in direction to the correction of chromatic aberration occurring singly in the fourth lens unit having negative refractive power, and it will become difficult to correct chromatic aberration in the entire variable power region and high optical performance will become unobtainable, and this is not preferable. Also, in the case exceeding the upper limit value of conditional expression (2) the correction of chromatic aberration occurring singly in the fourth lens unit having negative refractive power will become excessive and therefore, it will become difficult to achieve balance by other lens units, and it will become difficult to obtain high optical performance.

It is more desirable that the upper limit value of conditional expression (2) be 0.01.

(A-3) It is desirable that the third lens unit have a diffraction optical portion and the phase coefficient C2 in the term of the second order at that time satisfy the condition that $$-0.1 < C2 < 0. \quad (3)$$

By a diffraction optical portion being also used in the third lens unit having the strongest positive refractive power, it becomes possible to restrain the fluctuation of chromatic aberration upon zooming, and obtain high optical performance in the entire variable power vegion.

Further, by conditional expression (3) being satisfied, the diffraction optical portion is set so as to correct chromatic aberration occurring by the positive refractive power of the third lens unit.

In the case below the lower limit value of conditional expression (3) the correction of chromatic aberration occurring singly in the third lens unit having positive refractive power will become excessive and therefore it will become difficult to achieve balance by other lens units, and high optical performance will become unobtainable, and this is not preferable. Also, in the case exceeding the upper limit value of conditional expression (3) the correction of chromatic aberration will be opposite in direction to the correction of chromatic aberration occurring singly in the third lens unit having positive refractive power, and it will become difficult to correct chromatic aberration in the entire variable power region and high optical performance will become unobtainable, and this not preferable.

It is more desirable that the lower limit value of conditional expression (3) be −0.01.

(A-4) The second lens unit comprises a single positive lens.

By the second lens unit being comprised of a single lens, downsizing becomes easy.

In the present invention, the third lens unit and the fourth lens unit are constructed with relatively strong refractive power, and the fourth lens unit is made to bear its great share of the variable power ratio and the third lens unit is made to bear its small share of the variable power ratio. Therefore, the second lens unit need not be so strengthened in refractive power and is therefore comprised of a single lens, and has its length in the direction of the optical axis made small. This resultantly becomes advantageous for the downsizing of the entire lens system.

More preferably, the second lens unit may be of a meniscus shape convex toward the object side. According to this, it becomes easy to well correct spaherical aberration particularly at the telephoto end.

(A-5) A stop is disposed between the second lens unit and the third lens unit.

If a stop is disposed between the second lens unit and the third lens unit, the downsizing of the diameter of the fore lens will become easy. Also, the exit pupil will be at an appropriate position, and with the downsizing of the diameter of the fore lens, this is also effective for the correction of aberrations.

More preferably, the stop may be moved toward the object side so that the distance thereof to the third lens unit may widen from the wide angle end to the telephoto end. According to this, the flare component of the intermediate region upon zooming can be eliminated well, and this is desirable. Also, in order to simplify the mechanical structure, the stop may be adapted to be moved with the fourth lens unit.

(A-6) It is preferable that when the focal length of the fourth lens unit is defined as f4 and the focal length of the entire system at the wide angle end is defined as fw, the condition that $$0.40 < |f4/fw| < 0.70 \quad (4)$$

be satisfied.

Conditional expression (4) relates to the ratio between the focal length of the fourth lens unit and the focal length of the entire system at the wide angle end, and particularly achieves the balance between downsizing and high performance.

In the case below the lower limit value of conditional expression (4) the refractive power of the fourth lens unit will become too strong and particularly distortion at the wide angle end will increase and become difficult to correct, and this is not preferable. Also, in the case exceeding the upper limit value of conditional expression (4) the refractive power of the fourth lens unit will become too weak and the amount of movement of the fourth lens unit upon zooming will increase and the full length of the lens will become great and the lens system of the fourth lens unit will also become bulky, and this is not preferable.

Also, to achieve the balance between downsizing and high performance, it is preferable that the lower limit value of conditional expression (4) be 0.45 and the upper limit value of conditional expression (4) be 0.60.

Figure 17:
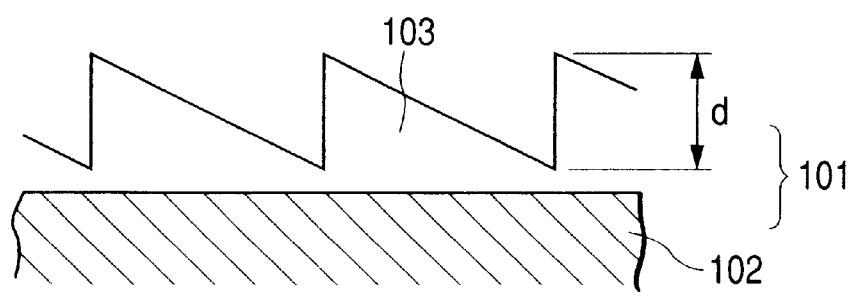
FIG. 17 is an illustration of a diffraction optical portion comprising a layer of diffraction grating.
Figure 19:
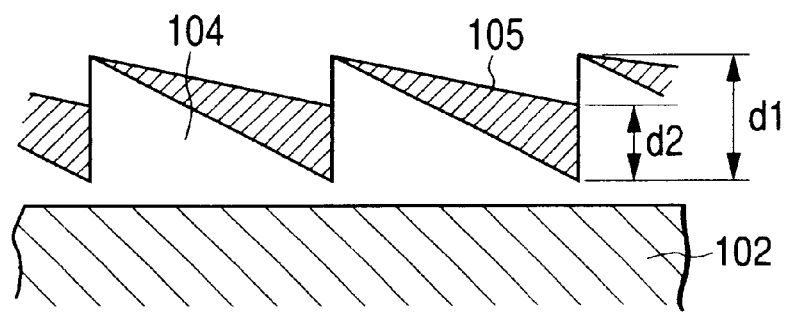
FIG. 19 is an illustration of a diffraction optical portion comprising two layers of diffraction grating.

(A-7) Applicable as the diffraction optical portion used in the present embodiments is a kinoform-shaped diffraction grating shown in FIG. 17 which is constructed of a layer or a two-layer construction as shown in FIG. 19 wherein two layers of different (or the same) grating thicknesses are laminated.

Thus, it is preferable that the diffraction optical portion be a laminated type diffraction grating comprising a plurality of phase type diffraction gratings arranged in the direction of the optical axis (the direction of travel of light).

As the diffraction optical portion, it is preferable to use a laminated type diffraction grating proposed by the assignee of the application in Japanese Patent Application Laid-Open No. 11-109242 or Japanese Patent Application Laid-Open No. 11-14043.

According to this, an improvement in diffraction efficiency is achieved and a flare component can be eliminated well and therefore, it becomes easy to obtain high optical performance.

Figure 18:
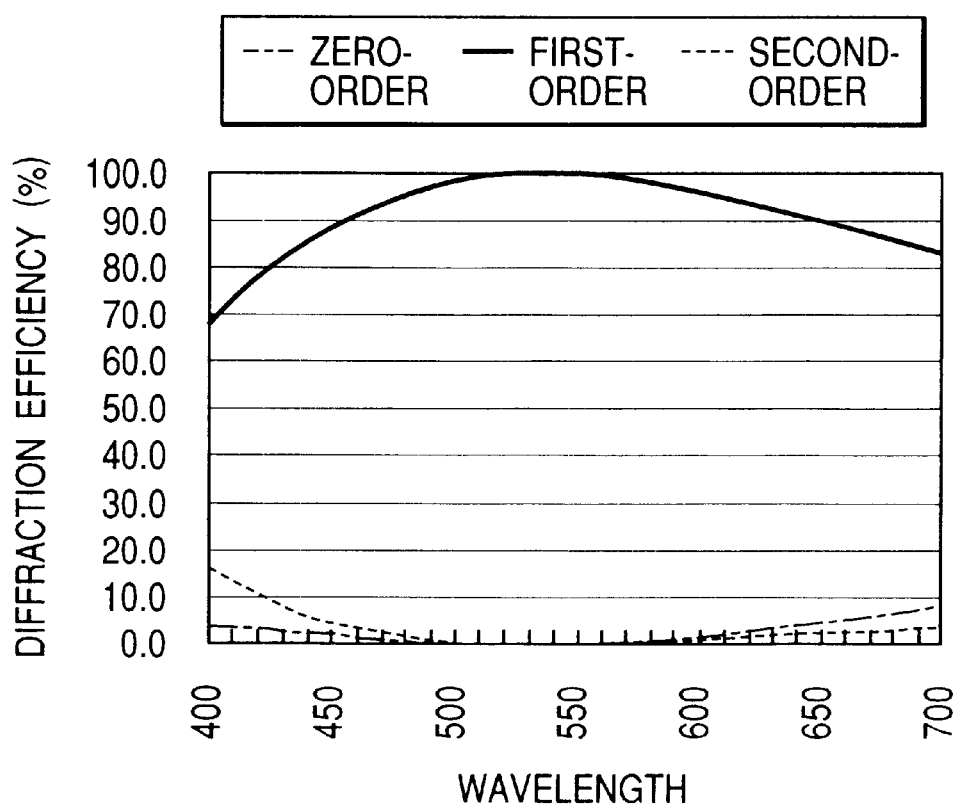
FIG. 18 is an illustration of the wavelength dependency of the diffraction optical portion of FIG. 17.

FIG. 18 shows the wavelength dependency of the diffraction efficiency of the first order diffracted light by a diffraction optical portion 101 shown in FIG. 17. The actual construction of the diffraction optical portion 101 comprises a base material 102 and ultraviolet-setting resin applied to the surface thereof, and a layer 103 of such a grating thickness d that the diffraction efficiency of the first order diffracted light becomes 100% at a wavelength of 530 nm formed on the resin portion.

As is apparent in FIG. 18, the diffraction efficiency of the design order lowers in wavelengths away from the optimized wavelength (design wavelength) 530 nm, while the diffraction efficiency of zero order diffracted light and second order diffracted light in the vicinity of the design order increases. The increase in the diffracted lights of the other orders than the design order becomes flare and leads to a reduction in the resolution of the optical system.

Figure 20:
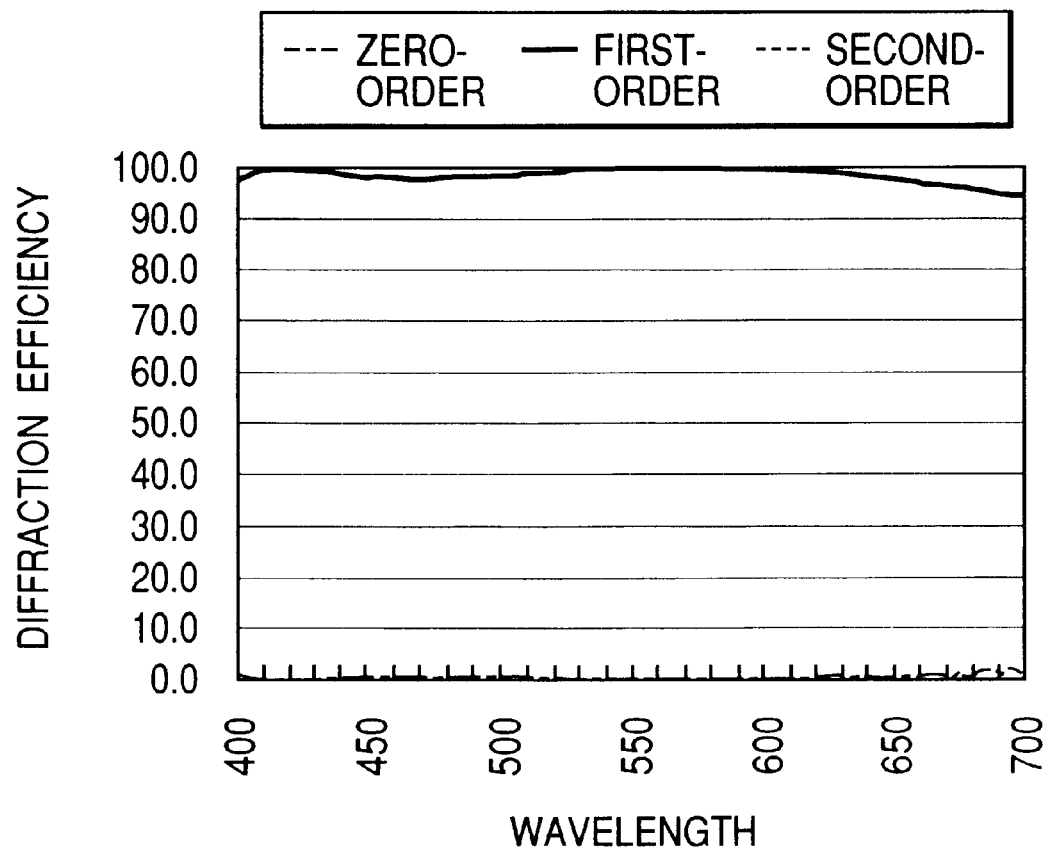
FIG. 20 is an illustration of the wavelength dependency of the diffraction optical portion of FIG. 19.

FIG. 20 shows the wavelength dependency of the diffraction efficiency of the first order diffracted light by a laminated type diffraction optical portion shown in FIG. 19 wherein two layers 104 and 105 are laminated.

In FIG. 19, a first layer 104 formed of ultraviolet-setting resin (nd=1.499, vd=54) is formed on a base material 102, and a second layer 105 formed of another ultraviolet-setting resin (nd=1.598, vd=28) is formed thereon. In this combination of materials, the grating thickness d1 of the first layer 104 is d1=13.8 μm, and the grating thickness d2 of the second layer 105 is d2=10.5 μm.

As can be seen from FIG. 20, by using a diffraction optical portion of laminated structure, the diffraction efficiency of the design order is as high as 95% or higher in the entire region of the used wavelength.

Figure 21:
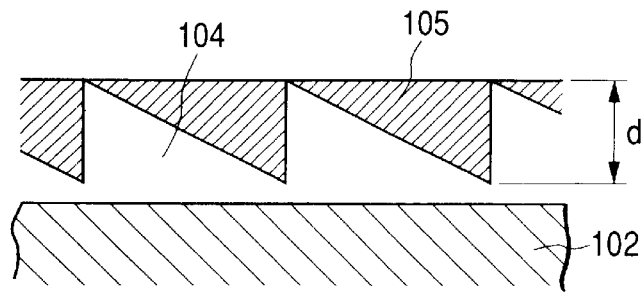
FIG. 21 is an illustration of another diffraction optical portion comprising two layers of diffraction grating.

The material of the aforedescribed diffraction optical portion of laminated structure is not limited to ultraviolet-setting resin, but other plastic materials or the like can also be used, and depending on the base material, the first layer 104 may be directly formed on the base material. Also, the grating thicknesses need not always differ from each other, but depending on the combination of materials, the grating thicknesses of the two layers 104 and 105 may be made equal to each other as shown in FIG. 21.

In this case, no grating shape is formed on the surface of the diffraction optical portion, and this leads to the excellence in dust-proof property, and can improve the assembling work for the diffraction optical portion.

(A-8) Focusing may preferably be effected by the third lens unit being moved toward the object side from an object at infinity to an object at close range. According to this, aberration fluctuation is small over the whole object distance and good optical performance is obtained.

Figure 22A:
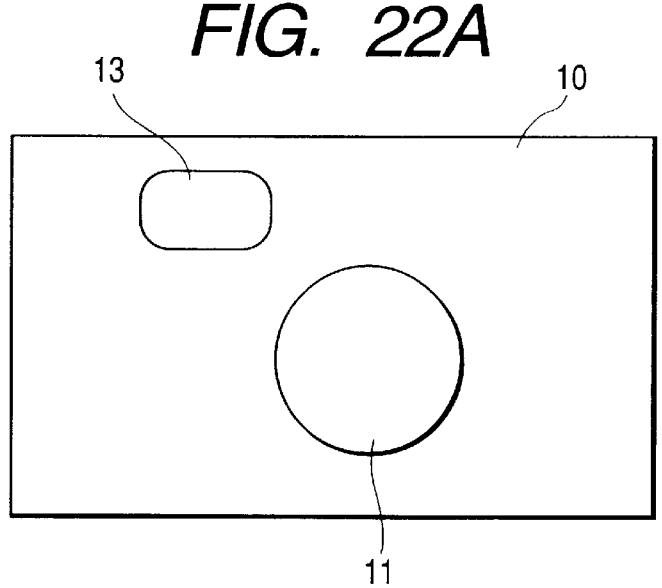
FIGS. 22A and 22B are schematic views of the essential portions of an optical apparatus.

An embodiment of a camera (optical apparatus) using the zoom lens according to the present embodiment as a photographing optical system will now be described with reference to FIGS. 22A and 22B. FIG. 22A is a front view of the camera, and FIG. 22B is a side cross-sectional view of the camera.

Figure 22B:
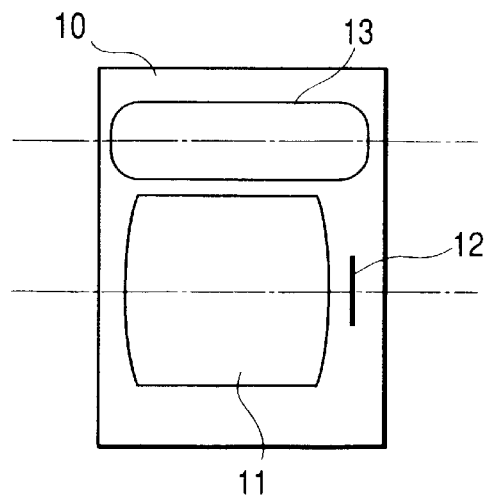

In FIGS. 22A and 22B, reference numeral 10 designates the main body of the camera, reference numeral 11 denotes a photographing optical system comprised of the zoom lnes according to the present embodiment, reference numeral 12 designates a film surface on which an object image is formed by the photographing optical system 11, and reference numeral 13 denotes a finder optical system for observing therethrough an object of which the image is to be formed on the film surface 12.

By thus applying the zoom lens according to the present embodiment to an optical apparatus such as a camera, there is realized a compact optical apparatus having high optical performance.

The numerical data of the aforedescribed numerical embodiments will now be shown. In the numerical embodiments, RI represents the radius of curvature of the ith surface from the object side, Di represents the air space or the thickness of the ith lens from the object side, and Ni and vi represent the refractive index and Abbe number, respectively, of the material of the ith optical member from the object side. Also, the relations between the aforementioned conditional expressions and the numerical embodiments are shown in Table 1 below.

When the direction of the optical axis is the X-axis, the direction perpendicular to the optical axis is the Y-axis, the direction of travel of light is positive, R is the paraxial radius of curvature, and K, B, C, D and E are aspherical surface coefficients, the aspherical shape is represented by the following expression:

$$X = \frac{(1/R)H^2}{1+\sqrt{1-(1+K)(Y/R)^2}} + BH^4 + CH^6 + DH^8 + EH^{10}$$

Also, "e-ox" means "$10^{-x}$".

TABLE 1

| Conditional Expression | Numerical Embodiment 1 | Numerical Embodiment 2 | Numerical Embodiment 3 | Numerical Embodiment 4 |
|---|---|---|---|---|
| (1) bfw/fw | 0.20 | 0.19 | 0.20 | 0.19 |
| (2) C2 (4th lens unit) | 0.0018 | 0.0013 | 0.0013 | 0.0018 |
| (3) C2 (3rd lens unit) | −0.0010 | −0.0008 | −0.0010 | −0.0008 |
| (4) \|f4/fw\| | 0.52 | 0.51 | 0.52 | 0.52 |

Numerical Embodiment 1 f = 23.0 ~ 87.0    Fno = 5.7 ~ 9.2    2ω = 73.8 ~ 22.4

| R1 = 111.683 | D1 = 2.80 | N 1 = 1.487490 | ν 1 = 70.2 |
| R2 = −31.484 | D2 = 0.10 | | |
| R3 = −29.459 | D3 = 1.00 | N 2 = 1.846660 | ν 2 = 23.8 |
| R4 = −161.019 | D4 = variable | | |
| R5 = 13.051 | D5 = 2.00 | N 3 = 1.698947 | ν 3 = 30.1 |
| R6 = 23.437 | D6 = variable | | |
| R7 = stop | D7 = variable | | |
| R8 = −8.396 | D8 = 0.90 | N 4 = 1.882997 | ν 4 = 40.8 |
| R9 = −13.628 | D9 = 0.18 | | |
| R10 = 38.975 | D10 = 2.70 | N 5 = 1.487490 | ν 5 = 70.2 |
| R11 = −14.738 | D11 = 0.20 | | |
| R12 = −87.008 | D12 = 3.05 | N 6 = 1.583126 | ν 6 = 59.4 |
| ‡ R13 = −12.394 | D13 = variable | | |
| ‡ R14 = −8.534 | D14 = 1.60 | N 7 = 1.740130 | ν 7 = 49.2 |
| R15 = −118.050 | | | |

| variable | focal length | | |
|---|---|---|---|
| spacing | 23.0 | 34.5 | 87.0 |
| D4 | 0.86 | 3.45 | 10.22 |
| D6 | 2.48 | 3.16 | 6.31 |
| D7 | 2.49 | 5.31 | 9.71 |

-continued

|     |      |      |      |
| --- | ---- | ---- | ---- |
| D13 | 8.98 | 6.16 | 1.76 |

Aspherical Surface Coefficient
13th Surface:
  K=−2.64412
  B=−3.37097e−5
  C=3.51536e−6
  D=−3.99235e−8
  E=3.54098e−11
14th Surface:
  K=−8.5343
  B=1.30765e−4
  C=2.02729e−6
  D=−2.44765e−8
  E=1.07089e−10
Phase Coefficient
13th Surface:
  C2=−9.99565e−04
  C4=−2.68057e−05
14th Surface:
  C2=1.78910e−03
  C4=6.37795e−06
Numerical Embodiment 2

| f = 23.3 ~ 89.0 | | Fno = 5.7 ~ 9.2 | | 2ω = 73.0 ~ 21.9 | |
| --- | --- | --- | --- | --- | --- |
| R1 = 119.032 | D1 = 2.80 | N 1 = 1.487490 | ν 1 = 70.2 |
| R2 = −31.228 | D2 = 0.09 | | |
| R3 = −29.459 | D3 = 1.00 | N 2 = 1.846660 | ν 2 = 23.8 |
| R4 = −161.019 | D4 = variable | | |
| R5 = 12.767 | D5 = 2.00 | N 3 = 1.698947 | ν 3 = 30.1 |
| R6 = 23.708 | D6 = variable | | |
| R7 = stop | D7 = variable | | |
| ‡ R8 = −8.000 | D8 = 0.90 | N 4 = 1.882997 | ν 4 = 40.8 |
| R9 = −14.439 | D9 = 0.16 | | |
| R10 = 29.867 | D10 = 2.70 | N 5 = 1.487490 | ν 5 = 70.2 |
| R11 = −12.269 | D11 = 0.20 | | |
| R12 = −78.704 | D12 = 3.05 | N 6 = 1.583126 | ν 6 = 59.4 |
| ‡ R13 = −13.246 | D13 = variable | | |
| ‡ R14 = −8.391 | D14 = 1.60 | N 7 = 1.740130 | ν 7 = 49.2 |
| R15 = −126.075 | | | |

| variable | focal length | | |
| --- | --- | --- | --- |
| spacing | 23.3 | 35.3 | 89.0 |
| D4 | 0.40 | 3.15 | 12.29 |
| D6 | 2.76 | 3.53 | 6.18 |
| D7 | 2.49 | 5.44 | 10.04 |
| D13 | 9.01 | 6.05 | 1.45 |

Aspherical Surface Coefficient
8th Surface:
  k=0
  B=−5.11456e−05
  C=2.49821e−06
  D=−1.04636e−07
13th Surface:
  k=−3.25729e+00
  B=−7.64692e−05
  C=4.76380e−06
  D=−4.35910e−08
  E=−9.43351e−11
14th Surface:
  k=−5.47159e−01
  B=1.15192e−04
  C=2.87142e−06
  D=−3.19023e−08
  E=1.34328e−10
Phase Coefficient
8th Surface:
  C2=−7.70584e−04
  C4=−3.28538e−05
14th Surface:
  C2=1.27153e−03
  C4=−7.01550e−06
Numerical Embodiment 3

| f = 24.0 ~ 90.0 | | Fno = 5.7 ~ 9.5 | | 2ω = 71.4 ~ 21.7 | |
| --- | --- | --- | --- | --- | --- |
| R1 = 140.596 | D1 = 2.80 | N 1 = 1.516330 | ν 1 = 64.2 |
| R2 = −32.219 | D2 = 0.09 | | |
| R3 = −30.279 | D3 = 1.00 | N 2 = 1.846660 | ν 2 = 23.8 |
| R4 = −129.776 | D4 = variable | | |
| R5 = 13.218 | D5 = 2.00 | N 3 = 1.698947 | ν 3 = 30.1 |
| R6 = 22.934 | D6 = variable | | |
| R7 = stop | D7 = variable | | |
| ‡ R8 = −8.528 | D8 = 0.90 | N 4 = 1.882997 | ν 4 = 40.8 |
| R9 = −15.588 | D9 = 0.16 | | |
| R10 = 29.867 | D10 = 2.70 | N 5 = 1.487490 | ν 5 = 70.2 |
| R11 = −12.269 | D11 = 0.20 | | |
| R12 = −64.666 | D12 = 3.05 | N 6 = 1.583126 | ν 6 = 59.4 |
| ‡ R13 = −13.681 | D13 = variable | | |
| ‡ R14 = −8.192 | D14 = 1.60 | N 7 = 1.677900 | ν 7 = 55.3 |
| R15 = −126.399 | | | |

| variable | focal length | | |
| --- | --- | --- | --- |
| spacing | 24.0 | 35.8 | 90.0 |
| D4 | 0.40 | 3.06 | 11.46 |
| D6 | 2.72 | 3.53 | 6.49 |
| D7 | 2.49 | 5.43 | 10.19 |
| D13 | 9.01 | 6.06 | 1.31 |

Aspherical Surface Coefficient
8th Surface:
  k=0
  B=−4.34953e−05
  C=5.49157e−06
  D=2.01635e−08
13th Surface:
  k=−3.29594e+00
  B=−4.99740e−05
  C=4.81501e−06
  D=−4.43218e−08
  E=−1.40085e−10
14th Surface:
  k=−4.99618e−01
  B=1.18006e−04
  C=3.59909e−06
  D=−3.83670e−08
  E=1.83805e−10
Phase Coefficient
8th Surface:
  C2=−1.01975e−03
  C4=−5.88195e−05
  C6=4.51956e−06

14th Surface:
 C2=1.34487e−03
 C4=−8.73746e−06
Numerical Embodiment 4

| | f = 24.0 ~ 88.0 | Fno = 5.7 ~ 9.5 | 2ω = 71.4 ~ 22.2 | |
|---|---|---|---|---|
| | R1 = 256.013 | D1 = 2.80 | N 1 = 1.516330 | ν 1 = 64.2 |
| | R2 = −33.718 | D2 = 0.13 | | |
| | R3 = −30.141 | D3 = 1.00 | N 2 = 1.846660 | ν 2 = 23.8 |
| | R4 = −114.263 | D4 = variable | | |
| | R5 = 13.483 | D5 = 2.00 | N 3 = 1.688931 | ν 3 = 31.1 |
| | R6 = 25.781 | D6 = variable | | |
| | R7 = stop | D7 = variable | | |
| ‡ | R8 = −8.663 | D8 = 0.90 | N 4 = 1.688931 | ν 4 = 31.1 |
| | R9 = −18.521 | D9 = 0.09 | | |
| | R10 = 29.867 | D10 = 2.70 | N 5 = 1.487490 | ν 5 = 70.2 |
| | R11 = −12.269 | D11 = 0.20 | | |
| | R12 = −58.481 | D12 = 3.05 | N 6 = 1.583126 | ν 6 = 59.4 |
| ‡ | R13 = −14.328 | D13 = variable | | |
| ‡ | R14 = −8.096 | D14 = 1.60 | N 7 = 1.677900 | ν 7 = 55.3 |
| | R15 = −110.977 | | | |

| variable spacing | focal length | | |
|---|---|---|---|
| | 24.0 | 35.7 | 88.0 |
| D4 | 0.40 | 3.56 | 12.56 |
| D6 | 3.07 | 3.80 | 6.42 |
| D7 | 2.49 | 5.48 | 10.25 |
| D13 | 9.07 | 6.08 | 1.31 |

Aspherical Surface Coefficient
8th surface:
 k=0
 B=−4.34953e−05
 C=5.49157e−06
 D=2.01635e−08
13th Surface:
 k=−3.05834e+00
 B=−6.54170e−05
 C=5.78955e−06
 D=−9.14739e−08
 E=4.75606e−10
14th Surface:
 k=−4.99618e−01
 B=1.18006e−04
 C=3.59909e−06
 D=−3.83670e−08
 E=1.83805e−10
Phase Coefficient
8th Surface:
 C2=−8.14229e−04
 C4=−4.26434e−05
 C6=3.49647e−06
 C8=0.00000e+00
14th Surface:
 C2=1.81687e−03
 C4=−9.60725e−06
 C6=0.00000e+00
 C8=0.00000e+00

What is claimed is:

1. A zoom lens comprising, in succession from the object side:
 a first lens unit of negative optical power, said first lens unit including a positive lens and a negative lens;
 a second lens unit of positive optical power;
 a third lens unit of positive optical power; and
 a fourth lens unit of negative optical power;
 wherein in case of zooming from the wide angle end to the telephoto end, the spacing between said first lens unit and said second lens unit is increased, the spacing between said second lens unit and said third lens unit is increased, and the spacing between said third lens unit and said fourth lens unit is decreased, and
 wherein at least one of said first to fourth lens units has a diffraction optical portion.

2. A zoom lens according to claim 1, wherein said fourth lens unit has a diffraction optical portion.

3. A zoom lens according to claim 1, wherein when the back focal length at the wide angle end is defined as bfw and the focal length of the entire system at the wide angle end is defined as fw, the condition that $$0.10 < bfw/fw < 0.40$$

is satisfied.

4. A zoom lens according to claim 1, wherein said fourth lens unit consists of a single lens.

5. A zoom lens according to claim 1, wherein said fourth lens unit has a diffraction optical portion, and when the phase $\phi(h)$ of said diffraction optical portion is expressed as $$\phi(h) = \frac{2\pi}{\lambda}(C1h + C2h^2 + C3h^3 + C4h^4 + \dots),$$

where
 $Ci$: ith order phase coefficient
 $h$: height from the optical axis
 $\lambda$: design wavelength,
the condition that $$0 < C2 < 0.1$$

is satisfied.

6. A zoom lens according to claim 1, wherein said third lens unit has a diffraction optical portion, and when the phase $\phi(h)$ of said diffraction optical portion is expressed as $$\phi(h) = \frac{2\pi}{\lambda}(C1h + C2h^2 + C3h^3 + C4h^4 + \dots),$$

where
 $Ci$: ith order phase coefficient
 $h$: height from the optical axis
 $\lambda$: design wavelength,
the condition that $$-0.1 < C2 < 0$$

is satisfied.

7. A zoom lens according to claim 1, wherein said second lens unit consists of a single positive lens.

8. A zoom lens according to claim 1, further comprising a stop disposed between said second lens unit and said third lens unit.

9. A zoom lens according to claim 1, wherein when the focal length of said fourth lens unit is defined as f4 and the focal length of the entire system at the wide angle end is defined as fw, the condition that $$0.40 <= f4/fw =< 0.70$$

is satisfied.

10. A zoom lens according to claim 1, wherein said diffraction optical portion is a laminated type diffraction grating in which a plurality of diffraction gratings are arranged in the direction of the optical axis.

11. An optical apparatus provided with the zoom lens of claim 1.

12. A zoom lens comprising, in succession from the object side:

a first lens unit of negative optical power;

a second lens unit of positive optical power;

a third lens unit of positive optical power; and a fourth lens unit of negative optical power;

wherein in case of zooming from the wide angle end to the telephoto end, the spacing between said first lens unit and said second lens unit is increased, the spacing between said second lens unit and said third lens unit is increased, and the spacing between said third lens unit and said fourth lens unit is decreased, and wherein said third lens unit has a diffraction optical portion, and when the phase $\phi(h)$ of said diffraction optical portion is expressed as $$\phi(h) = \frac{2\pi}{\lambda}(C1h + C2h^2 + C3h^3 + C4h^4 + \ldots),$$

where $C_i$: ith order phase coefficient h: height from the optical axis $\lambda$: design wavelength, the condition that $$-0.1 < C2 < 0$$

is satisfied.

* * * * *

UNITED STATES PATENT AND TRADEMARK OFFICE
CERTIFICATE OF CORRECTION

PATENT NO. : 6,657,791 B2
DATED : December 2, 2003
INVENTOR(S) : Takeshi Nishimura It is certified that error appears in the above-identified patent and that said Letters Patent is hereby corrected as shown below:

<u>Column 5,</u>
Line 36, "vof" should read -- v of --.

<u>Column 7,</u>
Line 42, "vegion" should read -- region --.

<u>Column 9,</u>
Line 63, "lnes" should read -- lens --.

<u>Column 14,</u>
Line 65, "=f4/fw=" should read -- |f4/fw| --.

Signed and Sealed this

Fifteenth Day of June, 2004

JON W. DUDAS
*Acting Director of the United States Patent and Trademark Office*